US012621039B2

(12) United States Patent
Zhou et al.

(10) Patent No.: US 12,621,039 B2
(45) Date of Patent: May 5, 2026

(54) CELL IDENTIFIER FOR PUCCH/PUSCH PATHLOSS REFERENCE OR BEAM REFERENCE SIGNAL

(71) Applicant: QUALCOMM Incorporated, San Diego, CA (US)

(72) Inventors: Yan Zhou, San Diego, CA (US); Fang Yuan, Beijing (CN); Mostafa Khoshnevisan, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 439 days.

(21) Appl. No.: 17/924,112

(22) PCT Filed: Jul. 31, 2020

(86) PCT No.: PCT/CN2020/106192
§ 371 (c)(1),
(2) Date: Nov. 8, 2022

(87) PCT Pub. No.: WO2022/021322
PCT Pub. Date: Feb. 3, 2022

(65) Prior Publication Data
US 2023/0180141 A1     Jun. 8, 2023

(51) Int. Cl.
*H04B 7/06* (2006.01)
*H04B 17/309* (2015.01)
*H04L 5/00* (2006.01)
*H04W 52/24* (2009.01)

(52) U.S. Cl.
CPC ....... *H04B 7/06968* (2023.05); *H04B 17/309* (2015.01); *H04L 5/0048* (2013.01); *H04W 52/242* (2013.01)

(58) Field of Classification Search
CPC ... H04W 16/28; H04W 52/10; H04W 72/232; H04W 74/00; H04W 72/21;
(Continued)

(56) References Cited

U.S. PATENT DOCUMENTS

| | | |
|---|---|---|
| 2011/0028181 A1 | 2/2011 | Byun et al. |
| 2019/0349867 A1 | 11/2019 | Molavianjazi et al. |

(Continued)

FOREIGN PATENT DOCUMENTS

| | | |
|---|---|---|
| CN | 103139856 A | 6/2013 |
| CN | 108401521 A | 8/2018 |

(Continued)

OTHER PUBLICATIONS

Huawei, et al., "Remaining Issues on UL-Based Positioning", 3GPP TSG RAN WG1 Meeting #96, R1-1901575, 3rd Generation Partnership Project, Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 15, 2019, XP051599272, 7 Pages, sections 4.2, 4.3, p. 4-p. 5.
(Continued)

*Primary Examiner* — Tu X Nguyen
(74) *Attorney, Agent, or Firm* — Procopio, Cory, Hargreaves & Savitch LLP

(57) ABSTRACT

The apparatus is configured to provide beam indication, TCI state or spatial relation, based on a reference signal of a non-serving cell and receiving the beam indication, and possibly a pathloss RS configuration, based on the RS of the non-serving cell.

28 Claims, 10 Drawing Sheets

(58) Field of Classification Search
　　CPC ............. H04W 74/0833; H04W 64/00; H04W
　　　　　　　　52/146; H04W 52/242; H04W 52/08;
　　　　　　　　H04W 52/143; H04W 52/285; H04W
　　　　　　　　　　　　　　74/0891; H04W 76/27
　　See application file for complete search history.

(56) References Cited

U.S. PATENT DOCUMENTS

| | | | | |
|---|---|---|---|---|
| 2020/0221405 | A1* | 7/2020 | Zarifi | .................... H04W 52/50 |
| 2021/0083813 | A1* | 3/2021 | Wu | ................... H04W 36/0072 |
| 2023/0096215 | A1* | 3/2023 | Cao | ...................... H04B 7/0695 |
| | | | | 370/329 |
| 2023/0113940 | A1* | 4/2023 | Matsumura | ......... H04W 72/231 |
| 2023/0171763 | A1* | 6/2023 | Gao | ...................... H04W 52/08 |
| | | | | 370/329 |

FOREIGN PATENT DOCUMENTS

| | | |
|---|---|---|
| CN | 110536438 A | 12/2019 |
| CN | 110769470 A | 2/2020 |
| WO | WO-2018133771 A1 * | 7/2018 ............. H04B 7/024 |
| WO | 2020056180 A1 | 3/2020 |
| WO | WO-2020091645 A1 * | 5/2020 |

OTHER PUBLICATIONS

Supplementary European Search Report—EP20947197—Search Authority—Munich—May 27, 2024.
Supplementary Partial European Search Report—EP20947197—Search Authority—Munich—Mar. 4, 2024.
Asustek: "Remaining Issues on Beam Management", 3GPP TSG RAN WG1 Meeting #92bis, 3GPP Draft, R1-1804035, Remaining Issues on Beam Management, 3rd Generation Partnership Project (3GPP), Mobile Competence Centre, 650, Route Des Lucioles, F-06921, Sophia-Antipolis Cedex, France, vol. RAN WG1, No. Sanya, China, Apr. 16, 2018-Apr. 20, 2018, Apr. 15, 2018, XP051426324, 5 pages.
International Search Report and Written Opinion—PCT/CN2020/106192—ISA/EPO—Apr. 25, 2021.

* cited by examiner

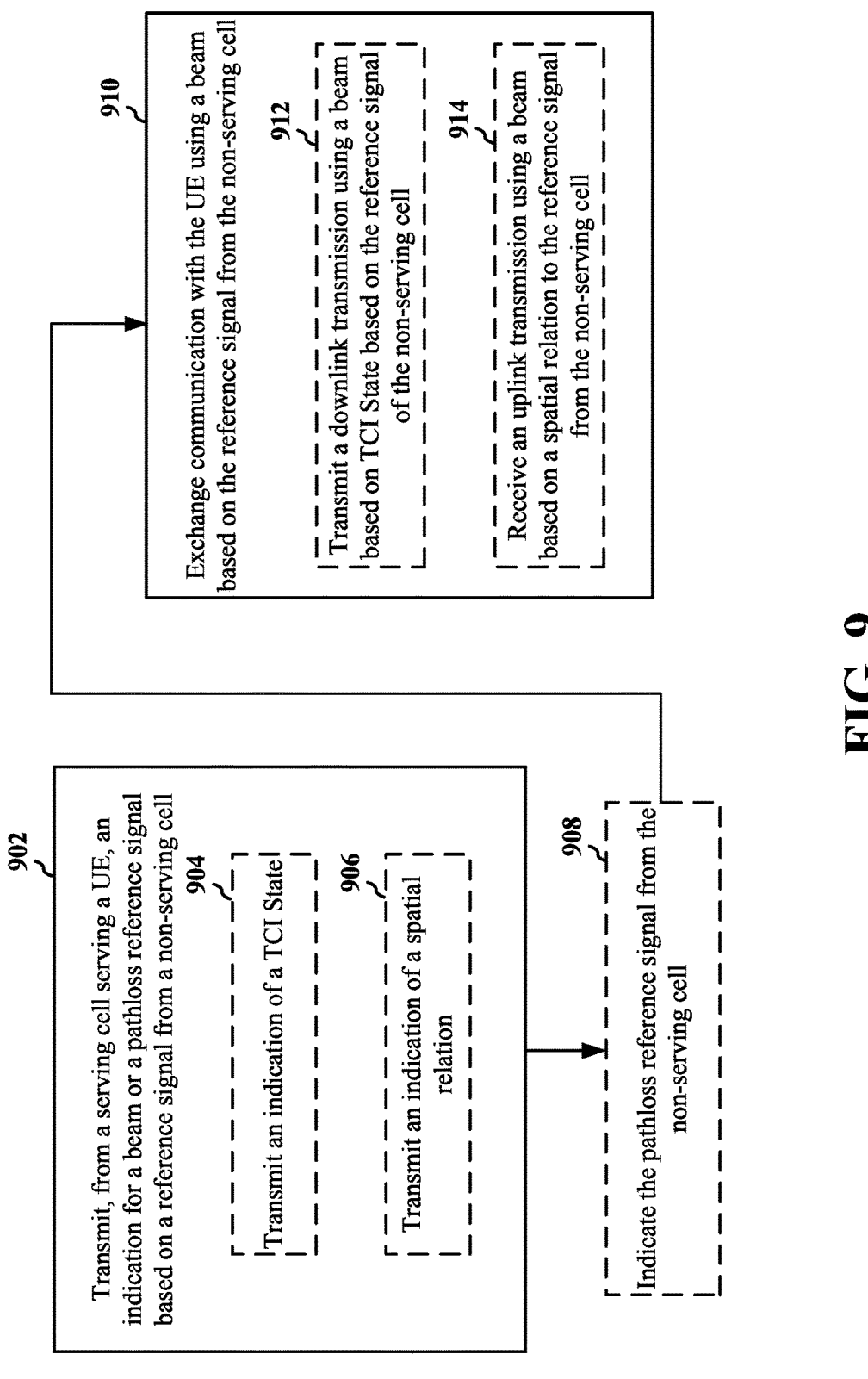

Transmit, from a serving cell serving a UE, an indication for a beam or a pathloss reference signal based on a reference signal from a non-serving cell

902

904

Transmit an indication of a TCI State

906

Transmit an indication of a spatial relation

908

Indicate the pathloss reference signal from the non-serving cell

Exchange communication with the UE using a beam based on the reference signal from the non-serving cell

910

912

Transmit a downlink transmission using a beam based on TCI State based on the reference signal of the non-serving cell

914

Receive an uplink transmission using a beam based on a spatial relation to the reference signal from the non-serving cell

CELL IDENTIFIER FOR PUCCH/PUSCH PATHLOSS REFERENCE OR BEAM REFERENCE SIGNAL

CROSS REFERENCE TO RELATED APPLICATION(S)

This application is National Stage Application filed under 35 U.S.C. § 371 of PCT International Application No. PCT/CN2020/106192, entitled "CELL IDENTIFIER FOR PUCCH/PUSCH PATHLOSS REFERENCE OR BEAM REFERENCE SIGNAL" and filed Jul. 31, 2020, which is expressly incorporated by reference herein in its entirety.

BACKGROUND

Technical Field

The present disclosure relates generally to communication systems, and more particularly, to wireless communication based on directional beams.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects presented herein provide for added mobility among different cells and enable a base station to provide improved service to a UE through beam switching across a serving cell and one or more non-serving cells. In some examples, the aspects may be applied for layer 1 (L1) or layer 2 (L2) inter-cell mobility based on beam management for the serving cell and one or more non-serving cells. Each serving cell may have a single TRP having a PCI or multiple TRPs using the same PCI. Each TRP of a serving cell with multiple TRPs may have a different TRP ID.

In order to provide for improved mobility for a UE, a base station may indicate a TCI state for downlink communication or a spatial relation for uplink communication based on a quasi co-location (QCL) relationship with a reference signal of another cell (e.g., a neighbor cell or a non-serving cell). For example, the base station may indicate a TCI state or a spatial relation for the UE that is QCL with an SSB of a non-serving cell. In other examples, the base station may indicate a TCI state or a spatial relation for the UE based on a QCL relationship to a CSI-RS of the non-serving cell or a PRS of the non-serving cell. When the base station indicates an uplink beam for the UE based on a QCL relationship with a reference signal from a non-serving cell, the UE may determine pathloss based on a signal from the non-serving cell.

In an aspect of the disclosure, a method, a computer-readable medium, and an apparatus are provided.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 9 is a flowchart of an example method of wireless communication at a base station.

DETAILED DESCRIPTION

Figure 1:
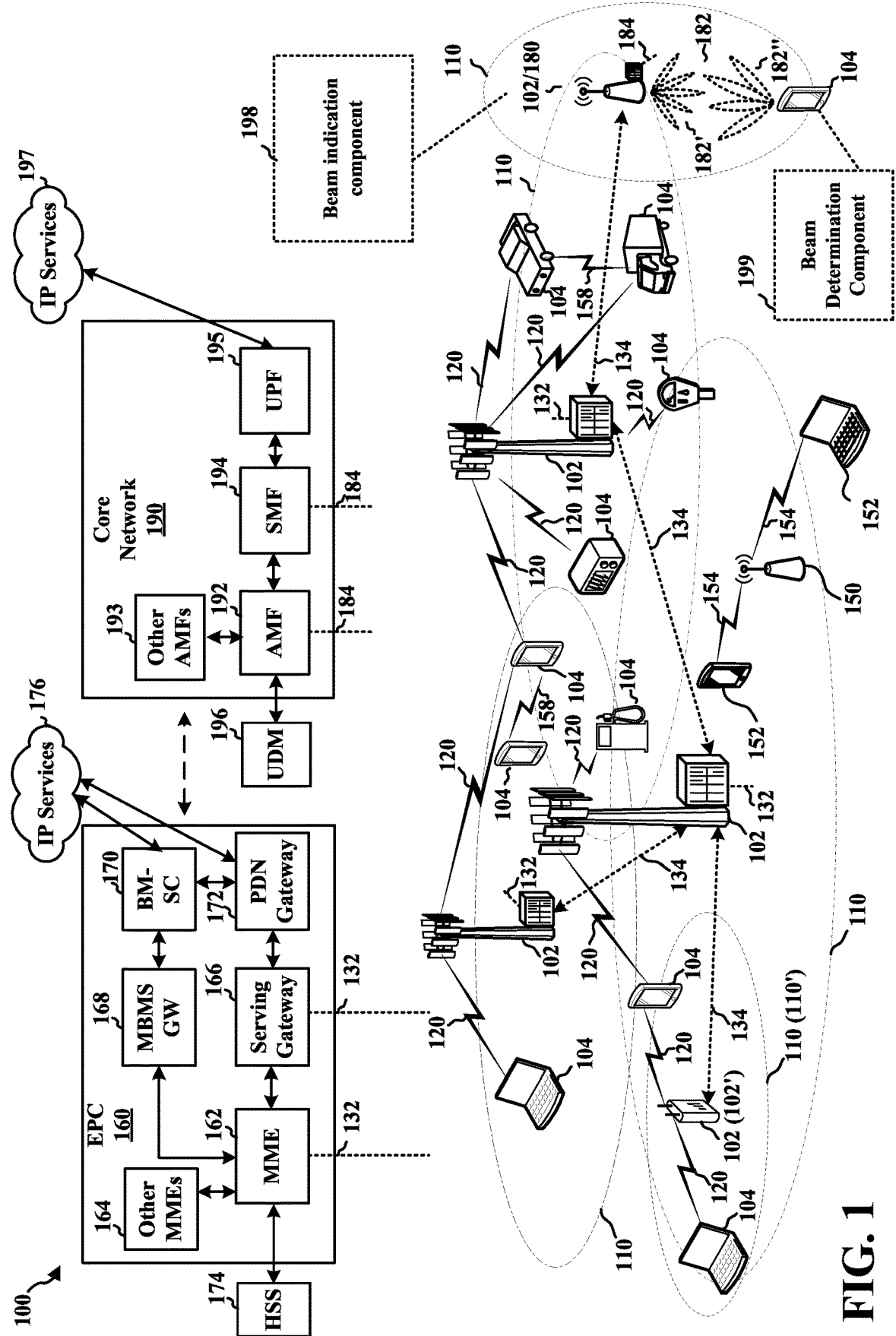
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to YMHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station.

Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Beam indication component 198 and Beam determination component are configured to provide beam indication (TCI state or spatial relation) based on a reference signal of a non-serving cell and receiving the beam indication (and possibly a pathloss RS configuration) based on the RS of the non-serving cell.

Referring again to FIG. 1, in certain aspects, the UE 104/base station 180 may be configured to provide beam indication (TCI state or spatial relation) based on a reference signal of a non-serving cell and receiving the beam indication (and possibly a pathloss RS configuration) based on the RS of the non-serving cell.

Figures 2A, 2B, 2C, 2D:
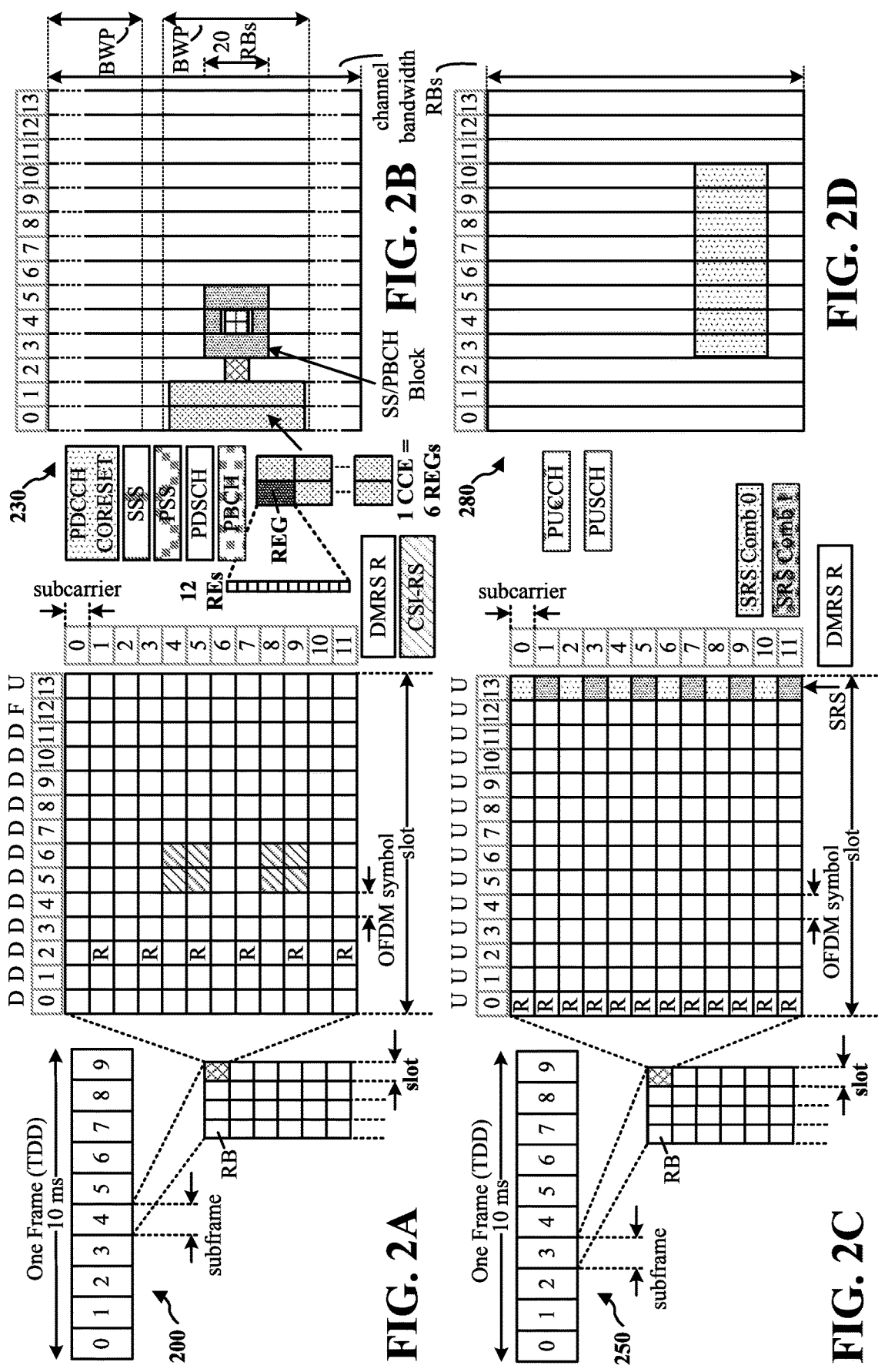
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^{\mu}$ slots/subframe. The subcarrier spacing and symbol length/duration are a function of the numerology. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
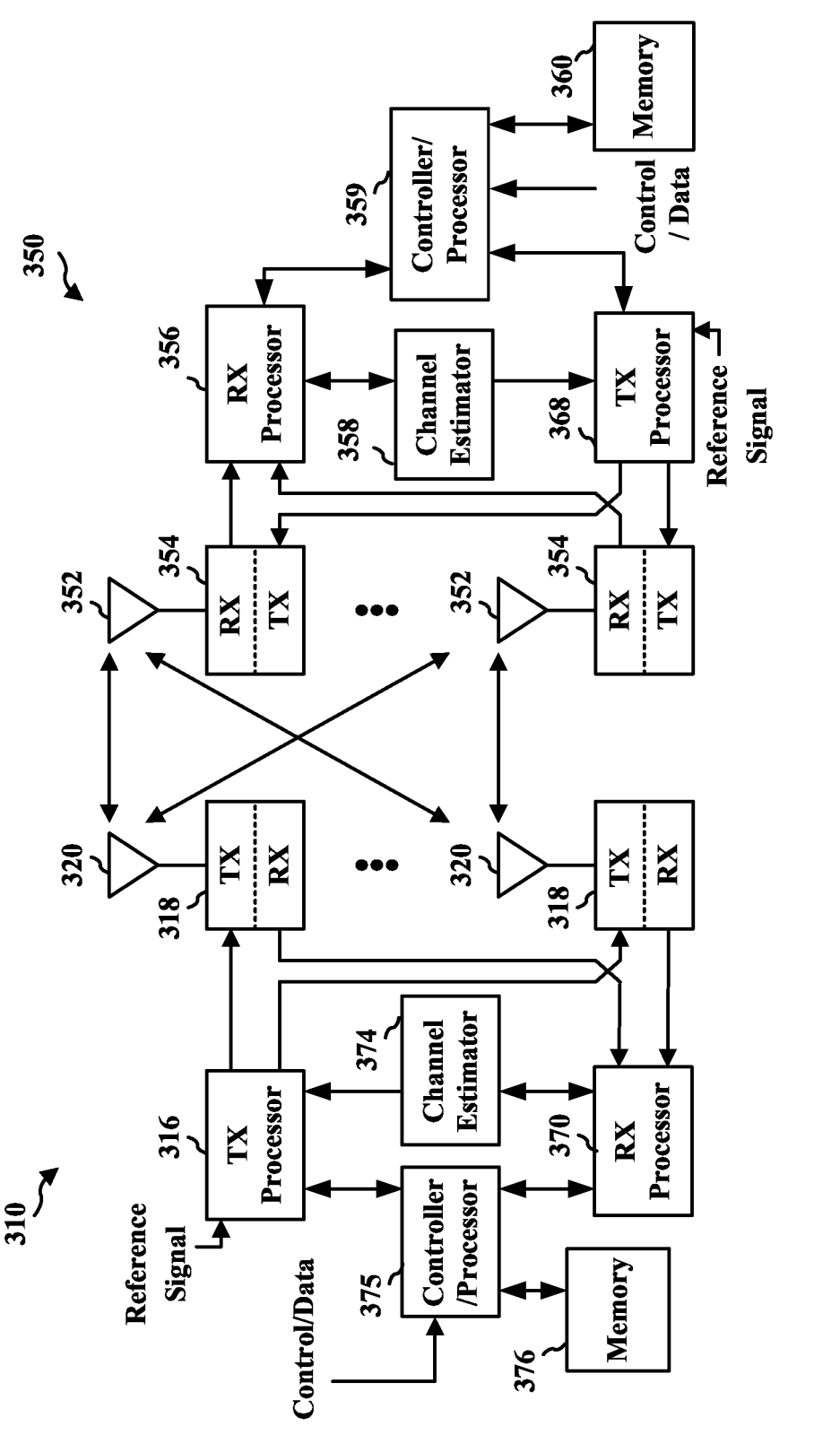
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions;

RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
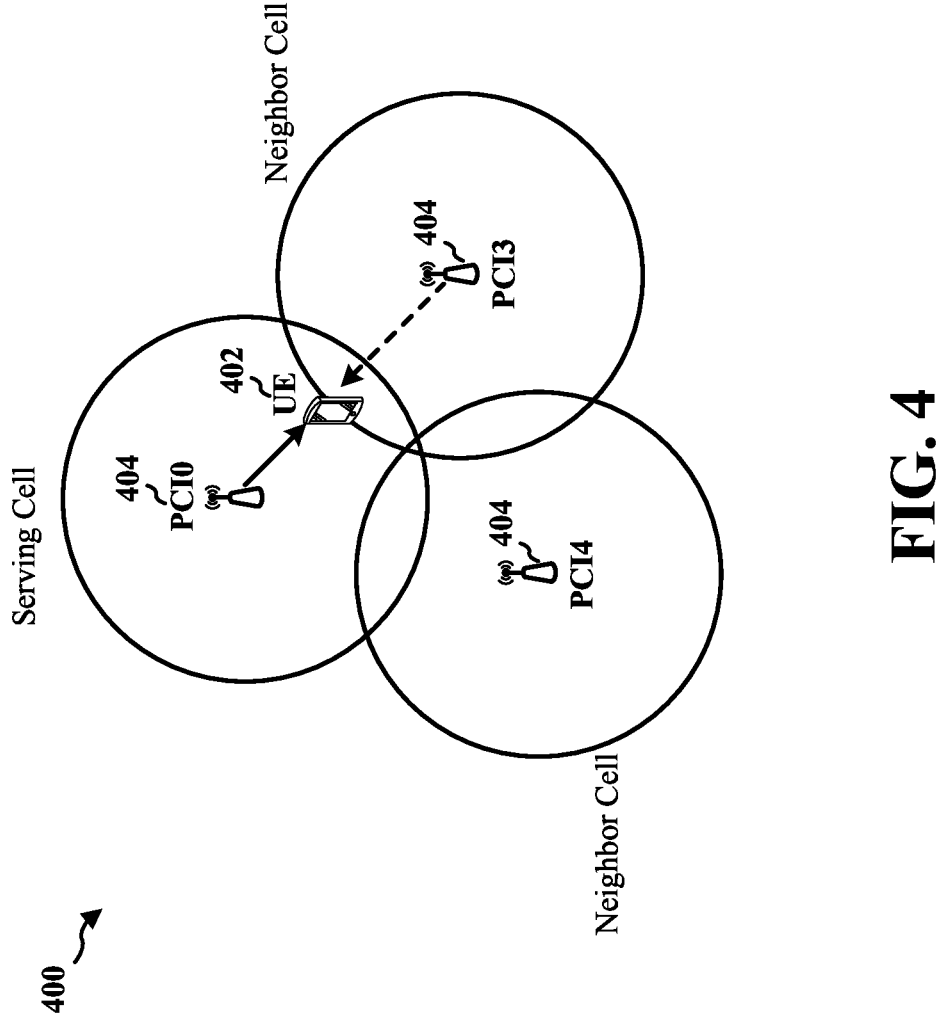
FIG. 4 is a diagram illustrating an example of a beam switching process.

FIG. 4 is a diagram 400 illustrating an example of a beam switching process. The diagram 400 includes a UE 402 and a plurality of base stations 404. The UE is being served by PCI0 that is associated with a base station 404, while PCI 3 and PCI4 are neighbor cells. In the diagram 400 of FIG. 4, L1/L2 inter-cell mobility may occur via beam switching across serving and non-serving cells. In some instances, each serving cell may have a single or multiple TRPs (e.g., base station) sharing the same PCI. In the example of FIG. 4 includes a configuration with a single TRP per serving cell. A TCI state or spatial relation for the downlink/uplink beam of the serving cell may be quasi co-located (QCL) with SSB from the PCI of the same serving cell or a neighbor non-serving cell. For example, as shown in FIG. 4, the TCI state may be QCL with the SSB from PCI0. In some instances, the neighbor non-serving cell may be utilized to provide a beam indication.

At least one of the TX processor 368, the RX processor 356, and the controller/processor 359 may be configured to perform aspects in connection with 198/199 of FIG. 1.

At least one of the TX processor 316, the RX processor 370, and the controller/processor 375 may be configured to perform aspects in connection with 198/199 of FIG. 1.

Aspects presented herein provide for added mobility among different cells and enable a base station to provide improved service to a UE through beam switching across a serving cell and one or more non-serving cells. In some examples, the aspects may be applied for layer 1 (L1) or layer 2 (L2) inter-cell mobility based on beam management for the serving cell and one or more non-serving cells. As described in connection with FIG. 4, each serving cell may have a single TRP having a PCI or multiple TRPs using the same PCI. Each TRP of a serving cell with multiple TRPs may have a different TRP ID. Although the aspects described herein are presented showing a single TRP for a serving cell, the aspects may also be applied by a serving cell having multiple TRPs.

In order to provide for improved mobility for a UE, a base station may indicate a TCI state for downlink communication or a spatial relation for uplink communication based on a quasi co-location (QCL) relationship with a reference signal of another cell (e.g., a neighbor cell or a non-serving cell). For example, the base station may indicate a TCI state or a spatial relation for the UE that is QCL with an SSB of a non-serving cell. In other examples, the base station may indicate a TCI state or a spatial relation for the UE based on a QCL relationship to a CSI-RS of the non-serving cell or a PRS of the non-serving cell. When the base station indicates an uplink beam for the UE based on a QCL relationship with a reference signal from a non-serving cell, the UE may determine pathloss based on a signal from the non-serving cell.

Figure 5:
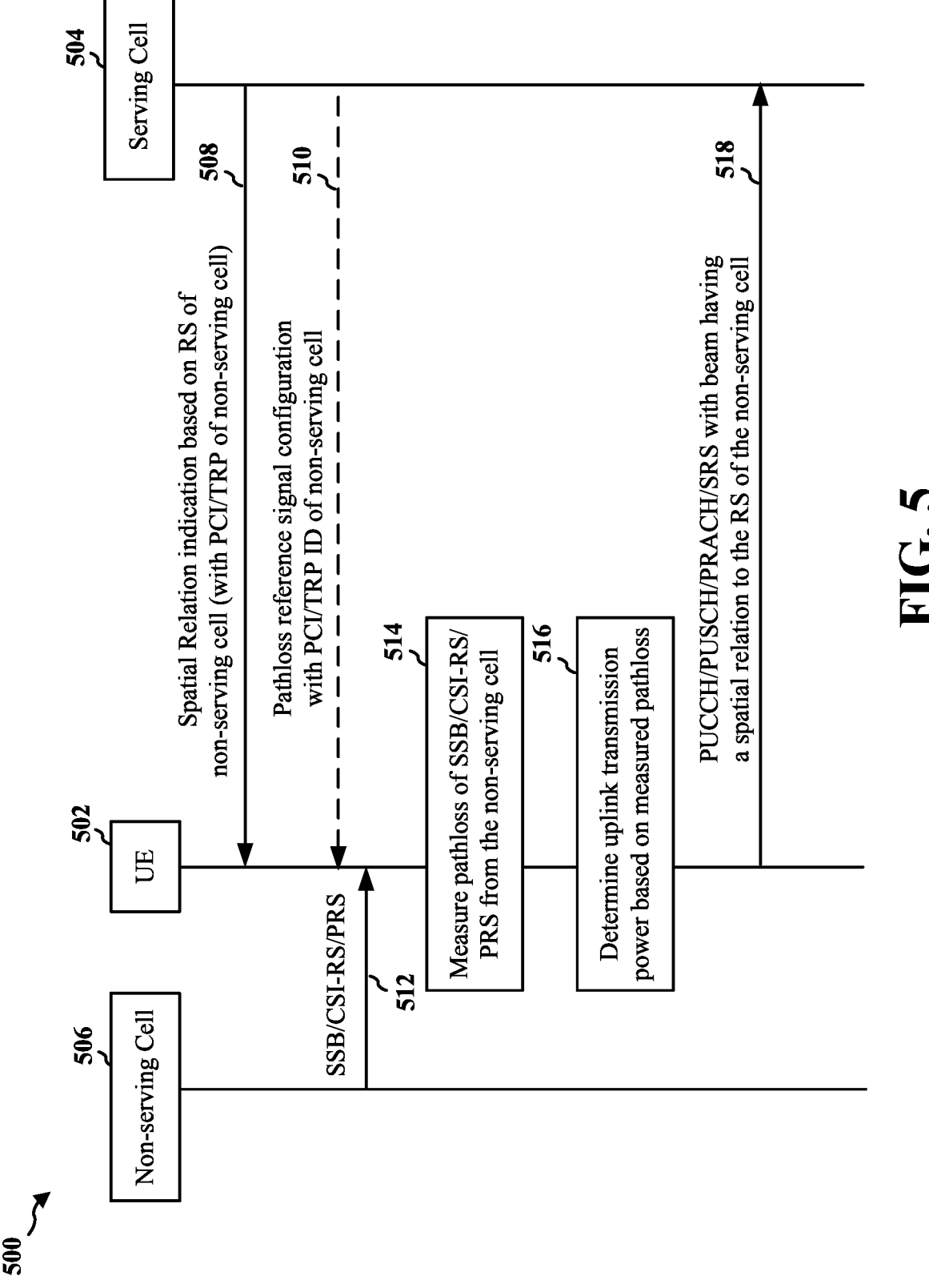
FIG. 5 is a communication flow, illustrating example communication between a UE, a serving cell, and a non-serving cell, including the use of a PL RS from the non-serving cell for transmissions of PUCCH, PUSCH, PRACH, and non-positioning SRS from the UE.

With reference to FIG. 5, a communication flow 500 is illustrated for communication between a UE, a serving cell, and a non-serving cell, including the use of a PL RS from the non-serving cell for transmissions of PUCCH, PUSCH, PRACH, and non-positioning SRS from the UE. The term "non-positioning SRS" may be used in the present application to refer to an SRS for beam management, an SRS for codebook based antenna switching, or an SRS for non-codebook based antenna switching. The communication flow 500 includes the exchange of communication between a UE 502, a serving cell 504, and a non-serving cell 506. The serving cell 504 may transmit a spatial relation indication 508 based on RS of non-serving cell 506 (with PCI/TRP of non-serving cell 506) to the UE 502. For example, the serving cell 504 may configure multiple spatial relations for the UE 502, and one or more of the configured spatial relations may have a QCL relationship to a reference signal from the non-serving cell 506. Then, the serving cell 504 may indicate a spatial relation from the spatial relations that are configured for the UE 504. If the UE 504 moves, the serving cell 504 may indicate a different spatial relation from the configured spatial relations for the UE. The UE 502 may use the spatial relation to determine one or more parameters for an uplink transmission. For example, the UE 502 may use the spatial relation to determine a directional beam to use to transmit the uplink transmission. In some examples, the UE 502 may use the spatial direction to determine a beam for an uplink transmission to the serving cell. Optionally, the serving cell 504 may transmit a pathloss reference signal configuration 510 indicating for the UE 502 to use a reference signal from the non-serving 506 to calculate a pathloss as part of determining a transmission power for the uplink transmission. The serving cell 504 may indicate the pathloss reference signal with PCI/TRP ID of non-serving cell 506. Although the spatial relation indication 508 and the pathloss reference signal configuration 510 are illustrated with separate lines, the indication of the spatial relation and the indication of the pathloss reference signal may be transmitted by the serving cell 504 in the same message, in some examples. In some examples, the same indication may indicate both the spatial relation and the pathloss reference signal. For example, if the serving cell 504 indicates a spatial relation for an uplink transmission from the UE based on a reference signal of the non-serving cell, the UE 502 may also determine the pathloss based on the indicated reference signal of the non-serving cell.

The non-serving cell 506 transmits a reference signal 512, e.g., a SSB, CSI-RS, or PRS. The UE 502 receives the reference signal 512 from the non-serving base station based on the serving cell's indication of the pathloss reference signal. At 514, the UE 502 measures a pathloss of the reference signal 512 from the non-serving cell 506. At 516, the UE determines an uplink transmission power based, at least in part, on the measured pathloss. The UE may calculate the uplink transmission power based on a formula that includes multiple factors. The measured pathloss may be one factor used to determine the uplink transmission power. The UE 502 then transmits an uplink transmission 518 using the spatial relation having a QCL relationship to the reference signal from the non-serving cell 506. The UE 502 may also use the uplink transmission power determined, at 516, to transmit the uplink transmission 518. As illustrated at 518, the uplink transmission may include one or more of a PUCCH, PUSCH, PRACH, or an SRS. In some examples, the SRS may be a non-positioning SRS, such as an SRS for beam management or antenna switching. The UE 502 may transmit the uplink transmission 518 with an uplink beam having a spatial relation to the RS of the non-serving cell. In some examples, the uplink transmission 518 may be transmitted from the UE 502 to the serving cell 504.

The serving cell 504 may indicate additional information about the beam indication RS and/or the pathloss reference signal, at 508 and/or 510, in addition to the identifier of the non-serving cell. The identifier of a non-serving cell may include the PCI ID or the TRP ID of non-serving cell. If the reference signal of the non-serving beam is an SSB, the serving cell may provide additional information about the SSB. For example, the serving cell may indicate configuration information about the SSB, such as one or more of an SSB carrier frequency of the non-serving cell SSB, a half frame index of the non-serving cell SSB, an SCS of the non-serving cell SSB, a periodicity of the non-serving cell SSB, an SMTC window configuration of the non-serving cell SSB, an SFN offset of the non-serving cell SSB, or a transmission power of the non-serving cell SSB. If the reference signal of the non-serving cell is a CSI-RS or a PRS, the serving cell may indicate a corresponding resource ID and/or resource set ID for the non-serving cell CSI-RS or PRS.

Figure 6:
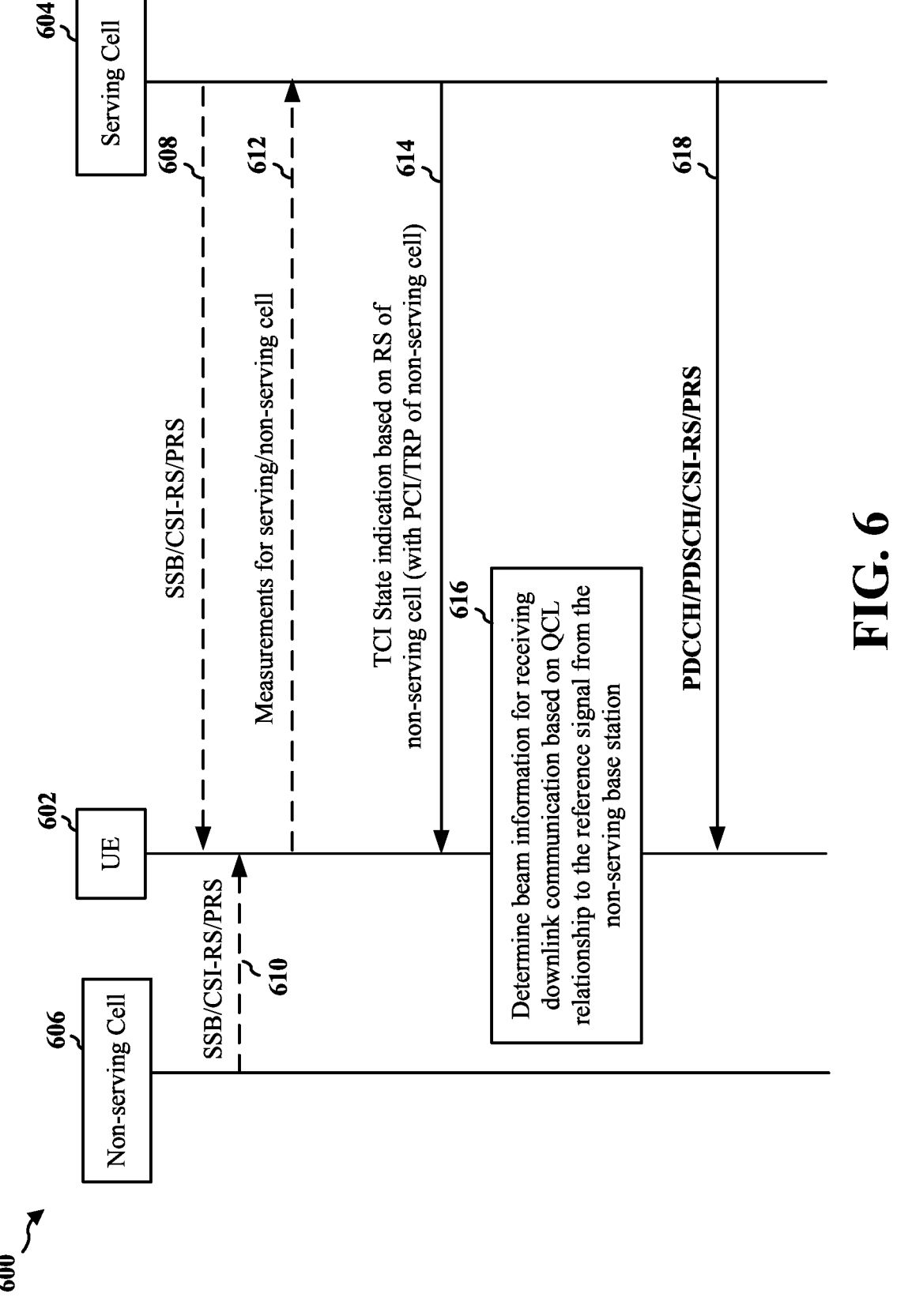
FIG. 6 is a communication flow, illustrating example communication between a UE, a serving cell, and a non-serving cell, including the transmission of a for beam indication reference signal from a non-serving cell.

With reference to FIG. 6, a communication flow 600 including the transmission of a for beam indication reference signal from a non-serving Cell, is described. A "beam indication RS" may refer to a reference signal that is used to indicate a beam for use by a UE. For example, for a downlink beam that the UE 602 uses to receive downlink transmissions from a base station, the beam indication reference signal may be a reference signal that is indicated in a TCI state configuration for the UE 502. For example, the TCI state may indicate a QCL relationship between a beam for a downlink transmission and particular reference signal. The reference signal having a QCL relationship with the beam may be referred to as a beam indication reference signal. Similarly, the base station may indicate a beam for the UE to use for an uplink transmission in a configured spatial relation for the UE. The spatial relation may indicate a QCL relationship between the intended beam and a reference signal. The reference signal indicated in the spatial relation may be referred to as a beam indication reference signal.

The communication flow 600 in FIG. 6 includes communication that is exchanged a UE 602, a serving cell 604, and a non-serving cell 606. Optional aspects are illustrated with a dashed line. The serving cell 604 may transmit a TCI State indication 614 indicating a TCI state for the UE 602 based on a reference signal of the non-serving cell 606. For example, the serving cell 604 may indicate that the reference signal is for the non-serving cell by including an identifier for the non-serving cell (e.g., with a PCI/TRP of the non-serving cell 606) when indicating the TCI state to UE 602. The identifier of a non-serving cell may include the PCI ID or the TRP ID of non-serving cell. For example, the serving cell 604 may configure multiple TCI states for the UE 602, and one or more of the configured TCI states may have a QCL relationship to a reference signal from the non-serving cell 606. Then, the serving cell 604 may indicate a TCI state from the configured TCI states for the UE 602. If the UE 602 moves, the serving cell 604 may indicate a different TCI state from the configured TCI states for the UE 602. The UE 602 may use the TCI state to determine one or more parameters for receiving a downlink transmission 618. For example, the UE 602 may use the TCI state to determine a directional beam to use to receive the downlink transmission 618 from the base station. In some examples, the UE 602 may use the TCI state to determine a beam for receiving a downlink transmission 618 from the serving cell 504.

In some examples, the serving cell 604 may transmit the TCI state indication 614 based on measurements from the UE 602. For example, the UE 602 may measure one or more reference signals 608 from the serving cell 604 and one or more reference signals 610 from the non-serving cell 606. The reference signals 608 from the serving cell 604 may include any of an SSB, a CSI-RS, or a PRS. The reference signal from the non-serving cell 606 may include any of an SSB, a CSI-RS, or a PRS. The UE may transmit measurements 612 for the reference signals of the serving/non-serving cells to the serving cell 604. The serving cell 604 may update a TCI state, e.g., active a TCI state, for the UE 602 based on the measurements 612 from the UE 602. For example, if the measurements indicate a better measurement for a reference signal from the non-serving cell than for a reference signal from the serving cell 604, the serving cell 604 may indicate a TCI state based on the reference signal from the non-serving cell.

The serving cell 604 may indicate additional information about the beam indication RS, at 614, in addition to the identifier of the non-serving cell. If the reference signal of the non-serving beam is an SSB, the serving cell may provide additional information about the SSB, e.g., at 614. For example, the serving cell may indicate configuration information about the SSB, such as one or more of an SSB carrier frequency of the non-serving cell SSB, a half frame index of the non-serving cell SSB, an SCS of the non-serving cell SSB, a periodicity of the non-serving cell SSB, an SMTC window configuration of the non-serving cell SSB, an SFN offset of the non-serving cell SSB, or a transmission power of the non-serving cell SSB. If the reference signal of the non-serving cell is a CSI-RS or a PRS, the serving cell may indicate a corresponding resource ID and/or resource set ID for the non-serving cell CSI-RS or PRS.

At 616, the UE 602 determines beam information for receiving downlink communication based on a QCL relationship to the reference signal from the non-serving base station. For example, the beam indication reference signal may be a QCL Type A, QCL Type B, QCL Type C, and/or QCL Type D reference signal in a TCI state for indicating a downlink beam for the UE 602 to use to receive downlink communication 618. A QCL Type A relationship to the reference signal may indicate a relationship to the Doppler shift, Doppler spread, average delay, and/or delay spread of the reference signal from the non-serving base station. A QCL Type B relationship to the reference signal may indicate a relationship to the Doppler shift and/or Doppler spread of the reference signal from the non-serving base station. A QCL Type C relationship to the reference signal may indicate a relationship to the Doppler shift or average delay of the reference signal from the non-serving base station. A QCL Type D relationship to the reference signal may indicate a relationship to a spatial, or directional, parameter of the reference signal from the non-serving base station. The indication 614 may indicate for the UE 602 to use the TCI state for the downlink beam to receive one or more of a PDCCH, a PDSCH, a CSI-RS, or a PRS.

The UE 602 then uses the determined beam information to receive downlink communication 618 from a base station. For example, the UE 602 may use the beam to receive one or more of PDCCH, PDSCH, CSI-RS, or PRS. In some examples, the downlink communication 618 may be transmitted from serving cell 604 to UE 602.

Figure 7:
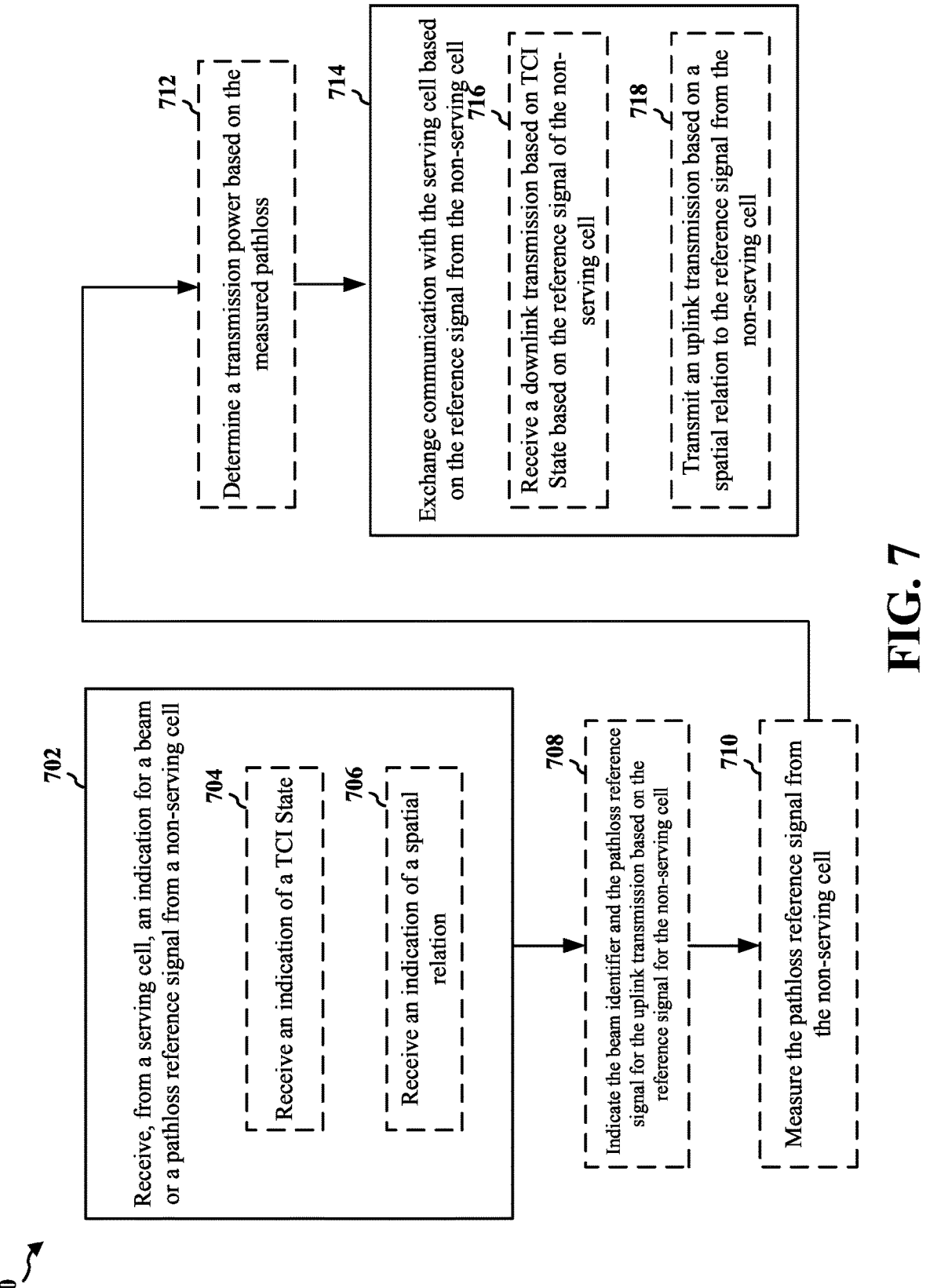
FIG. 7 is a flowchart of an example method of wireless communication at a user equipment served by a serving cell of a base station.

FIG. 7 is a flowchart 700 of a method of wireless communication at a UE served by a serving cell of a base station. The method 700 may be performed by a UE (e.g., the UE 104, 350, 502, 602; the apparatus 802). Optional aspects are illustrated with a dashed line. The method may enable a base station to provide for added mobility of a UE by indicating a spatial relation and/or pathloss reference signal based on a reference signal of a non-serving cell.

At 702, the UE receives, from the serving cell, an indication for a beam or a pathloss reference signal based on a reference signal from a non-serving cell. As illustrated at 704, the beam indication of the receiving action 702 may comprise a TCI state based on the reference signal from the non-serving cell. FIG. 6 illustrates an example of a UE 602 receiving a TCI state indication based on a reference signal of a non-serving cell 606. As illustrated at 706, the indication of the receiving step 702 may comprise a spatial relation based on the reference signal from the non-serving cell. For example, FIG. 5 illustrates an example of a UE 502 receiving an indication of a spatial relation based on a reference signal from a non-serving cell. The reception may be performed, e.g., by the TCI state component 840 and/or the spatial relation component 842 of the apparatus 802 in FIG. 8. For example, if the indication reference signal is a spatial relation, the reception may be performed by the spatial relation component 842, and if the indication reference signal is indicated for a TCI state, the reception may be performed, e.g., by the TCI state component 840.

At 714, the UE exchanges communication with the serving cell based on the reference signal from the non-serving cell. For example, if the UE receives an indication of a TCI state, at 704, exchanging the communication with the serving cell at 714 may include receiving downlink communication from the serving cell using the TCI state that is based on the reference signal from the non-serving cell, as illustrated at 716. If the UE receives an indication of a spatial relation, at 706, exchanging the communication with the serving cell at 714 includes transmitting uplink communication to the serving cell using the spatial relation that is based on the reference signal from the non-serving cell, as illustrated at 718. The exchange of the communication may be performed, e.g., by the reception component 830 and/or the transmission component 834 of the apparatus 802 in FIG. 8.

At 708, the indication indicates the beam identifier and the pathloss reference signal for the uplink transmission based on the reference signal for the non-serving cell. The indication may be performed, e.g., by the beam and pathloss component 804 of the apparatus 802 in FIG. 8. Where the indication comprises pathloss reference signal for an uplink transmission that is indicated based on the reference signal of the non-serving cell, at 710, which is optional, includes measuring the pathloss reference signal from the non-serving cell and, 712, which is also optional, includes determining a transmission power for the uplink transmission based on the pathloss reference signal from the non-serving cell. The pathloss reference signal measuring may be performed, e.g., by the pathloss reference signal measuring component, 846 and determining a transmission power for the uplink transmission may be performed, e.g., by the transmission power component 848 of the apparatus 802 in FIG. 8.

With respect to 710, 712, exchanging the communication with the serving cell of 714 may include transmitting the uplink transmission using the transmission power determined based on the pathloss reference signal from the non-serving cell.

With respect to 710-714, an option is for the uplink transmission to include at least one of a PUCCH, a PUSCH, a PRACH, or a SRS. An additional option is where the uplink transmission comprises the non-positioning SRS, and wherein the UE transmits the non-positioning SRS as a part of beam management, codebook antenna switching, or non-codebook antenna switching.

An option with respect to 708 includes indicating a cell identifier for the non-serving cell. An additional option is that the cell identifier includes a PCI for the non-serving cell or a TRP identifier for the non-serving cell.

Another option with respect to 708 includes that the pathloss reference signal is a SSB of the non-serving cell, a CSI-RS of the non-serving cell, or a PRS of the non-serving cell. An additional option is that the indication is comprised in a configuration of the pathloss reference signal includes at least one of: a carrier frequency for the SSB of the non-serving cell, a half-frame index for the SSB of the non-serving cell, a subcarrier spacing (SCS) for the SSB of the non-serving cell, a period for the SSB of the non-serving cell, a SMTC window configuration for the SSB of the non-serving cell, a time offset for the SSB of the non-serving cell, and/or a transmission power for the SSB of the non-serving cell. Another option is that the indication is comprised in a configuration of the pathloss reference signal that includes at least one of: a resource identifier (ID) for the CSI-RS of the non-serving cell, and/or a resource set ID for the CSI-RS of the non-serving cell. A further option is that the indication is comprised in a configuration of the pathloss reference signal that includes at least one of: an ID for the PRS from the non-serving cell, and/or a resource set ID for the PRS from the non-serving cell.

US 12,621,039 B2

17

Another option where the beam indication comprises a TCI state based on the reference signal from the non-serving cell, and exchanging the communication with the serving cell includes receiving downlink communication using the TCI state that is based on the reference signal from the non-serving cell includes that the downlink communication, which is received using the TCI state that is based on the reference signal from the non-serving cell, includes one or more of a PDCCH, PDSCH, a CSI-RS, or a PRS. A further option includes that the TCI state includes a QCL relationship with the reference signal from the non-serving cell. With respect to the QCL relationship, an option includes that the QCL relationship is based on at least one of a Doppler shift, a Doppler spread, an average delay, a delay spread, or a spatial parameter relative to the reference signal of the non-serving cell.

Another option where the indication comprises a spatial relation based on the reference signal from the non-serving cell, and exchanging the communication with the serving cell includes transmitting uplink communication using the spatial relation that is based on the reference signal from the non-serving cell includes that the uplink communication, which is transmitted using the TCI state that is based on the reference signal from the non-serving cell, includes one or more of a PUCCH, a PUSCH, a PRACH, or a SRS.

An option for the method 700 of wireless communication at a user equipment (UE) served by a serving cell of a base station includes the reference signal on which the indication is based being an SSB of the non-serving cell, a CSI-RS of the non-serving cell, or a PRS of the non-serving cell. Another option is that the indication is based on the SSB of the non-serving cell, and the UE further receives, from the serving cell, at least one of: a carrier frequency for the SSB of the non-serving cell, a half-frame index for the SSB of the non-serving cell, a SCS for the SSB of the non-serving cell, a period for the SSB of the non-serving cell, a SMTC window configuration for the SSB of the non-serving cell, a time offset for the SSB of the non-serving cell, and/or a transmission power for the SSB of the non-serving cell. A further option is that the indication is based on the CSI-RS of the non-serving cell, and the UE further receives, from the serving cell, at least one of: an ID for the CSI-RS of the non-serving cell, and/or a resource set ID for the CSI-RS of the non-serving cell. A still further option is that the indication is based on the PRS of the non-serving cell, and the UE further receives, from the serving cell, at least one of: a resource identifier (ID) for the PRS from the non-serving cell, and/or a resource set ID for the PRS from the non-serving cell.

FIG. 9 is a flowchart 900 of a method of wireless communication at a base station where a UE is served by a serving cell of the base station. The method 900 may be performed by a base station (e.g., the base station 102/180; the apparatus 1002). Optional aspects are illustrated with a dashed line. The method may enable a base station to provide for added mobility of a UE by indicating a spatial relation and/or pathloss reference signal based on a reference signal of a non-serving cell.

At 902, the base station transmits, from a serving cell serving a UE, an indication for a beam or a pathloss reference signal based on a reference signal from a non-serving cell. As illustrated in 904, the beam indication of the transmitting action 902 may comprise a TCI state based on the reference signal from the non-serving cell. FIG. 6 illustrates an example of a serving cell 604 for a base station transmitting to the UE 602 a TCI state indication based on a reference signal of the non-serving cell 606. An option at 904 is for the downlink communication, which is transmitted using the TCI state that is based on the reference signal from the non-serving cell, to include one or more of a physical downlink control channel (PDCCH), a physical downlink shared channel (PDSCH), a channel state information reference signal (CSI-RS), or a positioning reference signal (PRS). As illustrated in 906, the indication of the transmitting action 902 may comprise a spatial relation based on the reference signal from the non-serving cell. For example, FIG. 5 illustrates an example of a serving cell 504 of a base station transmitting an indication of a spatial relation based on a reference signal from a non-serving cell. The transmission may be performed, e.g., by the TCI state transmission component 1040 and/or the spatial relation transmission component 1042 of the apparatus 1002 in FIG. 10. For example, if the indication reference signal is a spatial relation, the reception may be performed by the spatial relation transmission component 1042, and if the indication reference signal is indicated for a TCI state, the reception may be performed, e.g., by the TCI state transmission component 1040.

At 910, the serving cell for the base station exchanges communication with the UE based on the reference signal from the non-serving cell.

For example, if the serving cell for the base station transmits an indication of a TCI state, at 912, exchanging the communication with the UE at 910 may include transmitting downlink communication to the UE using the TCI state that is based on the reference signal from the non-serving cell. If the serving cell for the base station transmits an indication of a spatial relation, at 914, exchanging the communication with the UE at 910 includes receiving an uplink communication from the UE using the spatial relation that is based on the reference signal from the non-serving cell.

Figure 10:
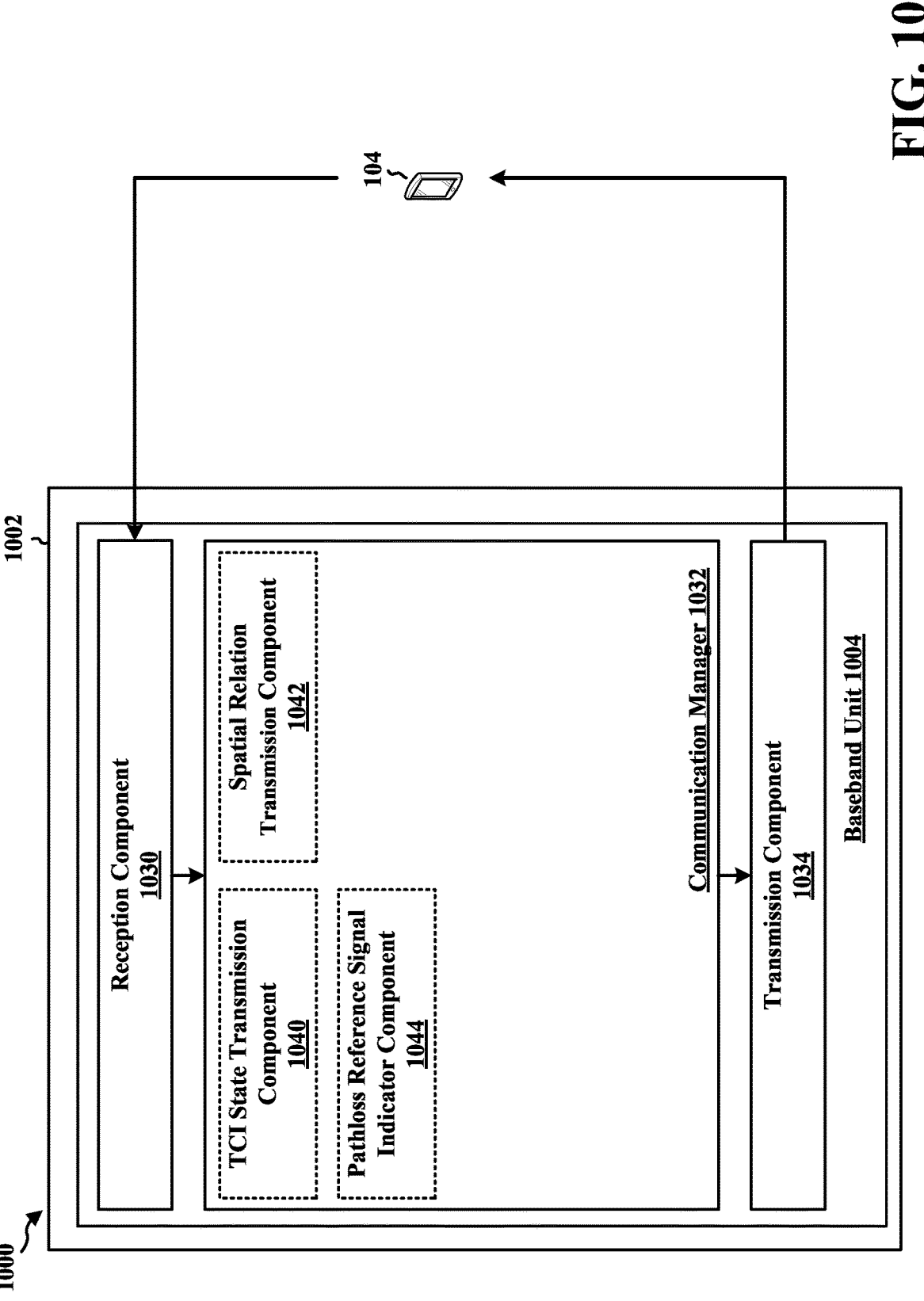
FIG. 10 is a diagram illustrating an example of a hardware implementation for an example apparatus.

The exchange of the communication may be performed, e.g., by the reception component 1030 and/or the transmission component 1034 of the apparatus 1002 in FIG. 10.

At 908, which is optional, the indication indicates the pathloss reference signal from the non-serving cell, which may be performed by pathloss reference signal indicator component 1044 of FIG. 10.

An additional option, at 914, includes that the indication includes a cell identifier for the non-serving cell. A further option is that the cell identifier includes a PCI for the non-serving cell or a TRP identifier for the non-serving cell. A still further option is that the pathloss reference signal is a SSB of the non-serving cell, a CSI-RS of the non-serving cell, or a PRS of the non-serving cell. An additional option is that the indication is comprised in a configuration of the pathloss reference signal that includes at least one of: a carrier frequency for the SSB of the non-serving cell, a half-frame index for the SSB of the non-serving cell, a SCS for the SSB of the non-serving cell, a period for the SSB of the non-serving cell, a SMTC window configuration for the SSB of the non-serving cell, a time offset for the SSB of the non-serving cell, and/or a transmission power for the SSB of the non-serving cell. Another option is that the indication is comprised in a configuration of the pathloss reference signal that includes at least one of: an ID for the CSI-RS of the non-serving cell, and/or a resource set ID for the CSI-RS of the non-serving cell. A still further option is that the indication is comprised in a configuration of the pathloss reference signal that includes at least one of: an ID for the PRS from the non-serving cell, and/or a resource set ID for the PRS from the non-serving cell.

At optional 912, where the indication indicates a TCI state based on the reference signal from the non-serving cell, exchanging the communication with the serving cell includes transmitting downlink communication to the UE using the TCI state that is based on the reference signal from the non-serving cell.

At optional 914, wherein the indication indicates a spatial relation based on the reference signal from the non-serving cell, exchanging the communication with the serving cell includes receiving uplink communication from the UE using the spatial relation that is based on the reference signal from the non-serving cell. An additional option of 914 comprises that the uplink communication, which is received using the TCI state that is based on the reference signal from the non-serving cell, includes one or more of a PUCCH, a PUSCH, a PRACH, or a SRS. Another option is that the downlink communication, which is transmitted using the TCI state that is based on the reference signal from the non-serving cell, includes one or more of a PDCCH, a PDSCH, a CSI-RS, or a PRS. A further option is that the TCI state includes a QCL relationship with the reference signal from the non-serving cell. A still further option is that the QCL relationship is based on at least one of a Doppler shift, a Doppler spread, an average delay, a delay spread, or a spatial parameter relative to the reference signal of the non-serving cell.

Another option of 900 is that the reference signal on which the indication is based is a SSB of the non-serving cell, a CSI-RS of the non-serving cell, or a PRS of the non-serving cell. An additional option is that the indication is based on the SSB of the non-serving cell, and the base station further transmits, to the UE, at least one of: a carrier frequency for the SSB of the non-serving cell, a half-frame index for the SSB of the non-serving cell, a SCS for the SSB of the non-serving cell, a period for the SSB of the non-serving cell, a SMTC window configuration for the SSB of the non-serving cell, a time offset for the SSB of the non-serving cell, and/or a transmission power for the SSB of the non-serving cell. Another option is that the indication is based on the CSI-RS of the non-serving cell, and the base station further transmits, to the UE, at least one of: an ID for the CSI-RS of the non-serving cell, and/or a resource set ID for the CSI-RS of the non-serving cell. A still further option is that the indication is based on the PRS of the non-serving cell, and the base station further transmits, to the UE, at least one of: an ID for the PRS from the non-serving cell, and/or a resource set ID for the PRS from the non-serving cell.

Figure 8:
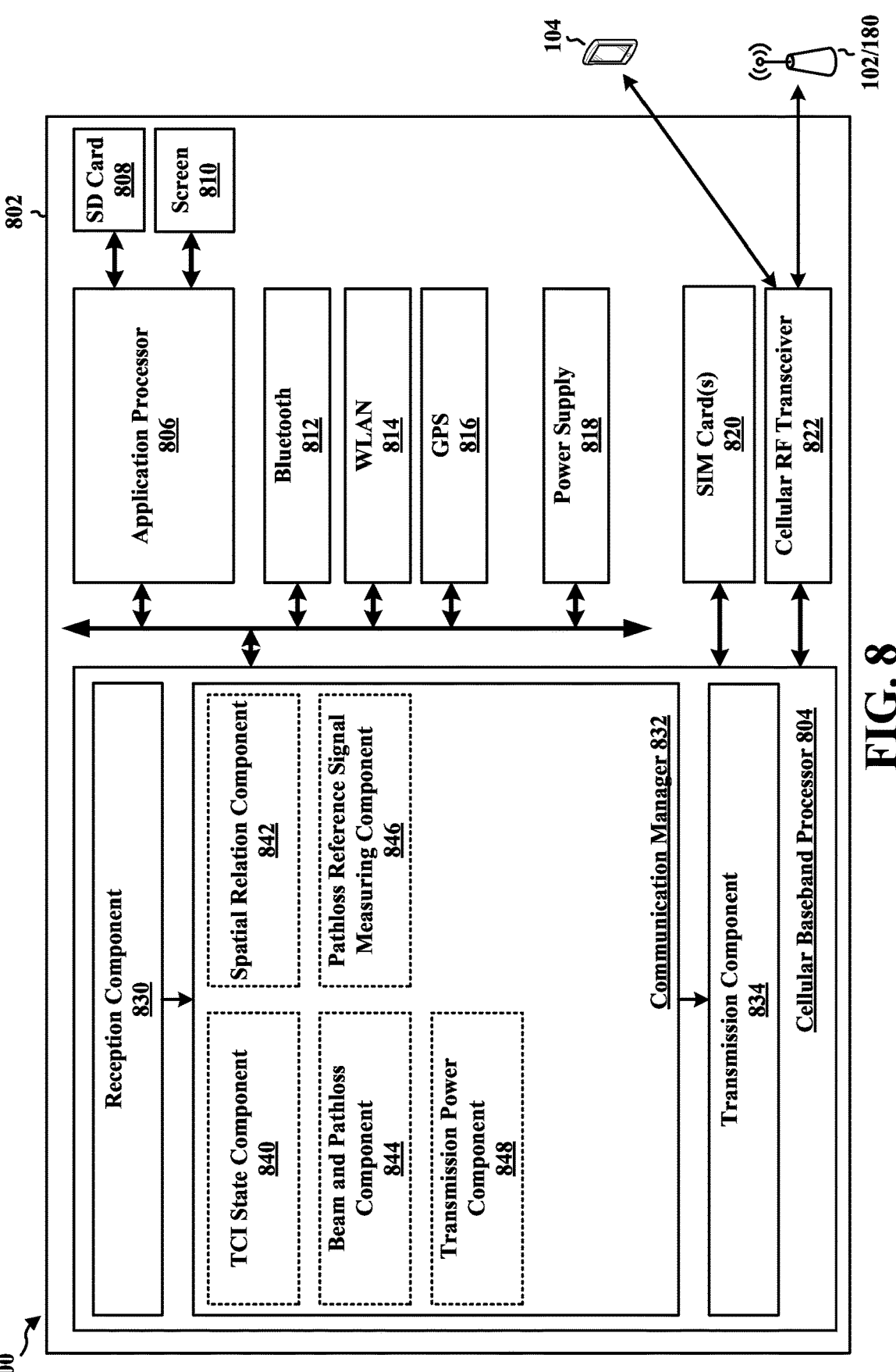
FIG. 8 is a diagram illustrating an example of a hardware implementation for an example apparatus.

FIG. 8 is a diagram 800 illustrating an example of a hardware implementation for an apparatus 802. The apparatus 802 is a UE and includes a cellular baseband processor 804 (also referred to as a modem) coupled to a cellular RF transceiver 822 and one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, and a power supply 818. The cellular baseband processor 804 communicates through the cellular RF transceiver 822 with the UE 104 and/or BS 102/180. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804. The cellular baseband processor 804 may be a component of the UE 350 and may include the memory 360 and/or at least one of the TX processor 368, the RX processor 356, and the controller/processor 359. In one configuration, the apparatus 802 may be a modem chip and include just the baseband processor 804, and in another configuration, the apparatus 802 may be the entire UE (e.g., see 350 of FIG. 3) and include the aforediscussed additional modules of the apparatus 802.

The communication manager 832 may be configured to receive, from the serving cell, an indication based on a reference signal from a non-serving cell, e.g., as described in connection with step 702 in FIG. 7. For example, the communication manager 832 may include a TCI state component 840 that is configure to receive an indication of a TCI state based on a reference signal of a non-serving cell, such as described in connection with 704. The communication manager 832 may include a spatial relation component 842 that is configured to receive an indication of a spatial relation based on a reference signal of a non-serving cell, such as described in connection with 706. The communication manager 832 may be further configured to exchange communication with the serving cell based on the reference signal from the non-serving cell, e.g., as described in connection with step 714 from FIG. 7. For example, the apparatus 802 may include a reception component 830 that is configured to receive downlink communication and a transmission component 834 that is configured to transmit uplink communication. The communication manager 832 further includes a beam and pathloss component 844 that is configured to indicate the beam identifier and the pathloss reference signal for the uplink transmission based on the reference signal for the non-serving cell, e.g., as described in connection with step 708 of FIG. 7. The communication manager 832 further includes a pathloss reference signal measuring component 846 that is configured to measure the pathloss reference signal from the non-serving cell, e.g., as described in connection with step 710 of FIG. 7. The communication manager 832 further includes a transmission power component 848 that is configured to determine a transmission power based on the measured pathloss, e.g., as described in connection with step 712 of FIG. 7.

The apparatus may include additional components that perform each of the blocks of the algorithm in the aforementioned flowcharts of FIGS. 7 and 9. As such, each block in the aforementioned flowcharts of FIGS. 7 and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the cellular baseband processor 804, includes means for receiving, from a serving cell, an indication for a beam or a pathloss reference signal from a non-serving cell, e.g., as described in connection with 702 of FIG. 7, means for receiving an indication of a TCI State, e.g., as described in connection with 704 of FIG. 7 as shown and described herein, means for receiving an indication of a spatial relation, e.g., as described in connection with 706 of FIG. 7 as shown and described herein, means for indicating the beam identifier and the pathloss reference signal for the uplink transmission based on the reference signal for the non-serving cell, e.g., as described in connection with 708 of FIG. 7 as shown and described herein, means for measuring the pathloss reference signal from the non-serving cell, e.g., as described in connection with 710 of FIG. 7 as shown and described herein, means for determining a transmission power based on the measured pathloss, e.g., as described in connection with 712 of FIG. 7 as shown and described herein, means for exchanging communication with the serving cell based on the reference signal from the non-serving cell, e.g., as described in connection with 714 of FIG. 7 as shown and described herein, means for receiving a downlink transmission based on TCI State based on the reference signal of the non-serving cell, e.g., as described in connection with 716 of FIG. 7 as shown and described herein, and means for transmitting an uplink transmission based on a spatial relation to the reference signal from the non-serving cell, e.g., as described in connection with 716 of FIG. 7 as shown and described herein. The aforementioned means may be one or more of the aforementioned components of the apparatus 802 configured to perform the functions recited by the aforementioned means. As described supra, the apparatus 8002 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

FIG. 10 is a diagram 1000 illustrating an example of a hardware implementation for an apparatus 1002. The apparatus 1002 is a BS and includes a baseband unit 1004. The baseband unit 1004 may communicate through a cellular RF transceiver with the UE 104. The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the BS 310 and may include the memory 376 and/or at least one of the TX processor 316, the RX processor 370, and the controller/processor 375.

The communication manager 1032 includes a TCI state transmission component component 1040 that transmits an indication of a TCI State, e.g., as described in connection with 904 of FIG. 9. The communication manager 1032 further includes a spatial relation transmission component 1042 that transmits an indication of a special relation, e.g., as described in connection with 906 of FIG. 9. The communication manager 1032 further includes a pathloss reference signal indicator component 1044 that indicates the pathloss reference signal from the non-serving cell, e.g., as described in connection with 908 of FIG. 9.

The apparatus may include additional components that perform each of the blocks of the algorithm in the aforementioned flowcharts of FIGS. 7 and 9. As such, each block in the aforementioned flowcharts of FIGS. 7 and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the baseband unit 1004, includes means for means for transmitting, from a serving cell serving a UE, an indication for a beam or a pathloss reference signal based on a reference signal from a non-serving cell, e.g., as described in connection with 902 of FIG. 9, means for transmitting an indication of a TCI State, e.g., as described in connection with 904 of FIG. 9, means for transmitting an indication of a special relation, e.g., as described in connection with 906 of FIG. 9, means for indicating the pathloss reference signal from the non-serving cell, e.g., as described in connection with 908 of FIG. 9, means for exchanging communication with the UE using a beam based on the reference signal from the non-serving cell, e.g., as described in connection with 910 of FIG. 9, means for transmitting a downlink transmission using a beam based on TCI State based on the reference signal of the non-serving cell, e.g., as described in connection with 912 of FIG. 9, and means for receiving an uplink transmission using a beam based on a spatial relation to the reference signal from the non-serving cell, e.g., as described in connection with 914 of FIG. 9. The aforementioned means may be one or more of the aforementioned components of the apparatus 1002 configured to perform the functions recited by the aforementioned means. As described supra, the apparatus 1002 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

What is claimed is:

1. A method of wireless communication at a user equipment (UE) served by a serving cell of a base station, comprising:

receiving, from the serving cell, an indication for a transmission configuration indication (TCI) state or spatial relation associated with a beam based on a reference signal from a non-serving cell;

identifying a pathloss reference signal from the non-serving cell, based on the reference signal from the non-serving cell; and exchanging communication with the serving cell using the beam based on the reference signal from the non-serving cell, wherein exchanging the communication with the serving cell includes transmitting an uplink transmission that includes at least one of a physical uplink control channel (PUCCH), a physical uplink shared channel (PUSCH), or a physical random access channel (PRACH) using a transmission power determined based on a measurement of the pathloss reference signal from the non-serving cell.

2. The method of claim 1, wherein the indication comprises the pathloss reference signal for the uplink transmission that is indicated based on the reference signal of the non-serving cell, the method further comprising:

measuring the pathloss reference signal from the non-serving cell; and determining the transmission power for the uplink transmission based on the pathloss reference signal from the non-serving cell, wherein exchanging the communication with the serving cell includes transmitting the uplink transmission using the transmission power determined based on the pathloss reference signal from the non-serving cell.

3. The method of claim 2, wherein the communication further comprises transmission of a non-positioning sounding reference signal (SRS), and wherein the UE transmits the non-positioning SRS as a part of beam management, codebook antenna switching, or non-codebook antenna switching using the transmission power determined based on the pathloss reference signal from the non-serving cell.

4. The method of claim 2, wherein the indication indicates a beam identifier and the pathloss reference signal for the uplink transmission based on the reference signal for the non-serving cell.

5. The method of claim 2, wherein the indication indicates a cell identifier for the non-serving cell.

6. The method of claim 5, wherein the cell identifier includes a physical cell identity (PCI) for the non-serving cell or a transmission reception point (TRP) identifier for the non-serving cell.

7. The method of claim 2, wherein the pathloss reference signal is a synchronization signal block (SSB) of the non-serving cell, a channel state information reference signal (CSI-RS) of the non-serving cell, or a positioning reference signal (PRS) of the non-serving cell.

8. The method of claim 7, wherein the indication is comprised in a configuration of the pathloss reference signal that includes at least one of: a carrier frequency for the SSB of the non-serving cell, a half-frame index for the SSB of the non-serving cell, a subcarrier spacing (SCS) for the SSB of the non-serving cell, a period for the SSB of the non-serving cell, a synchronization signal/physical broadcast channel block measurement time configuration (SMTC) window configuration for the SSB of the non-serving cell, a time offset for the SSB of the non-serving cell, or a configured transmission power for the SSB of the non-serving cell.

9. The method of claim 7, wherein the indication is comprised in a configuration of the pathloss reference signal that includes at least one of: a resource identifier (ID) for the CSI-RS of the non-serving cell, or a resource set ID for the CSI-RS of the non-serving cell.

10. The method of claim 7, wherein the indication is comprised in a configuration of the pathloss reference signal that includes at least one of: a resource identifier (ID) for the PRS from the non-serving cell, or a resource set ID for the PRS from the non-serving cell.

11. The method of claim 1, wherein the indication comprises the TCI state based on the reference signal from the non-serving cell, and wherein exchanging the communication with the serving cell further includes receiving downlink communication using the TCI state that is based on the reference signal from the non-serving cell.

12. The method of claim 11, wherein the downlink communication, which is received using the TCI state that is based on the reference signal from the non-serving cell, includes one or more of a physical downlink control channel (PDCCH), a physical downlink shared channel (PDSCH), a channel state information reference signal (CSI-RS), or a positioning reference signal (PRS).

13. The method of claim 11, wherein the TCI state includes a quasi co-location (QCL) relationship with the reference signal from the non-serving cell.

14. The method of claim 13, wherein the QCL relationship is based on at least one of a Doppler shift, a Doppler spread, an average delay, a delay spread, or a spatial parameter relative to the reference signal of the non-serving cell.

15. The method of claim 1, wherein the indication comprises a spatial relation based on the reference signal from the non-serving cell, and wherein exchanging the communication with the serving cell includes transmitting uplink communication to using the spatial relation that is based on the reference signal from the non-serving cell.

16. The method of claim 15, wherein the uplink communication, which is transmitted, uses a state that is based on the reference signal from the non-serving cell.

17. The method of claim 1, wherein the reference signal on which the indication is based is a synchronization signal block (SSB) of the non-serving cell, a channel state information reference signal (CSI-RS) of the non-serving cell, or a positioning reference signal (PRS) of the non-serving cell.

18. The method of claim 17, wherein the indication is based on the SSB of the non-serving cell, and the IE further receives, from the serving cell, at least one of: a carrier frequency for the SSB of the non-serving cell, a half-frame index for the SSB of the non-serving cell, a subcarrier spacing (SCS) for the SSB of the non-serving cell, a period for the SSB of the non-serving cell, a synchronization signal/physical broadcast channel block measurement time configuration (SMTC) window configuration for the SSB of the non-serving cell, a time offset for the SSB of the non-serving cell, or a transmission power for the SSB of the non-serving cell.

19. The method of claim 17, wherein the indication is based on the CSI-RS of the non-serving cell, and the UE further receives, from the serving cell, at least one of: a resource identifier (ID) for the CSI-RS of the non-serving cell, or a resource set ID for the CSI-RS of the non-serving cell.

20. The method of claim 17, wherein the indication is based on the PRS of the non-serving cell, and the IE further receives, from the serving cell, at least one of: a resource identifier (ID) for the PRS from the non-serving cell, or a resource set ID for the PRS from the non-serving cell.

21. An apparatus for wireless communication at a user equipment (UE) served by a serving cell of a base station, comprising:

memory; and at least one processor coupled to the memory and configured to:

receive, from the serving cell, an indication for a transmission configuration indication (TCI) state or spatial relation associated with a beam based on a reference signal from a non-serving cell;

identifying a pathloss reference signal from the non-serving cell, based on the reference signal from the non-serving cell; and exchange communication with the serving cell using the beam based on the reference signal from the non-serving cell, wherein the exchange of the communication with the serving cell includes transmission of an uplink transmission that includes at least one of a physical uplink control channel (PUCCH), a physical uplink shared channel (PUSCH), or a physical random access channel (PRACH) using a transmission power determined based on a measurement of the pathloss reference signal from the non-serving cell.

22. The apparatus of claim 21, wherein the indication comprises the pathloss reference signal for the uplink transmission that is indicated based on the reference signal of the non-serving cell, wherein the at least one processor is further configured to:

measure the pathloss reference signal from the non-serving cell; and determine the transmission power for the uplink transmission based on the pathloss reference signal from the non-serving cell, wherein the exchange of the communication with the serving cell includes the transmission of the uplink transmission using the transmission power determined based on the pathloss reference signal from the non-serving cell.

23. The apparatus of claim 21, wherein the indication comprises the TCI state based on the reference signal from the non-serving cell, and wherein exchange the communication with the serving cell further includes receive downlink communication using the TCI state that is based on the reference signal from the non-serving cell.

24. The apparatus of claim 21, wherein the indication comprises a spatial relation based on the reference signal from the non-serving cell, and wherein exchange the communication with the serving cell includes transmit uplink communication to using the spatial relation that is based on the reference signal from the non-serving cell.

25. The apparatus of claim 21, wherein the reference signal on which the indication is based is a synchronization signal block (SSB) of the non-serving cell, a channel state information reference signal (CSI-RS) of the non-serving cell, or a positioning reference signal (PRS) of the non-serving cell.

26. The apparatus of claim 21, wherein the pathloss reference signal is a synchronization signal block (SSB) of the non-serving cell, a channel state information reference signal (CSI-RS) of the non-serving cell, or a positioning reference signal (PRS) of the non-serving cell.

27. The apparatus of claim 26, wherein the indication is comprised in a configuration of the pathloss reference signal that includes at least one of: a carrier frequency for the SSB of the non-serving cell, a half-frame index for the SSB of the non-serving cell, a subcarrier spacing (SCS) for the SSB of the non-serving cell, a period for the SSB of the non-serving cell, a synchronization signal/physical broadcast channel block measurement time configuration (SMTC) window configuration for the SSB of the non-serving cell, a time offset for the SSB of the non-serving cell, or a configured transmission power for the SSB of the non-serving cell.

28. The apparatus of claim 26, wherein the indication is comprised in a configuration of the pathloss reference signal that includes at least one of: a resource identifier (ID) for the CSI-RS or the PRS of the non-serving cell, or a resource set ID for the CSI-RS or the PRS of the non-serving cell.

* * * * *